United States Patent [19]

Thomas

[11] Patent Number: 4,783,963
[45] Date of Patent: Nov. 15, 1988

[54] INTERNAL COMBUSTION STEAM ENGINE

[76] Inventor: Luther B. Thomas, 159 Herdon Ave., Shreveport, La. 71101

[21] Appl. No.: 5,606

[22] Filed: Jan. 21, 1987

Related U.S. Application Data

[63] Continuation of Ser. No. 834,381, Feb. 28, 1986, abandoned.

[51] Int. Cl.$^4$ ............................................. F01K 21/04
[52] U.S. Cl. ........................................ 60/511; 60/514; 60/712
[58] Field of Search ............... 60/614, 617, 619, 620, 60/712, 511, 514

[56] References Cited
U.S. PATENT DOCUMENTS

| | | | |
|---|---|---|---|
| 2,791,881 | 5/1957 | Denker | 60/619 |
| 3,426,524 | 2/1969 | Straub | 60/620 |
| 3,959,974 | 6/1976 | Thomas | 60/712 |

Primary Examiner—Allen M. Ostrager

[57] ABSTRACT

A high temperature, high pressure, four-cycle piston engine having two companion cylinders or multiple pairs of companion cylinders connected by a transfer valve or valves and working together to complete the four-cycle operation. The internal combustion of fuel and air in the ceramic cylinders is utilized as a means of producing heat and this heat is used to generate superheated steam by cyclicly injecting water into the hot power cylinders, with each power cylinder serving as a steam boiler. Ceramic pistons in the power cylinders use the power of the expanding steam to do useful work and operate to exhaust all gases after each power stroke. The engine can be adapted for both compression ignition and spark ignition operation.

1 Claim, 3 Drawing Sheets

INTERNAL COMBUSTION STEAM ENGINE

This is a continuation of the application Ser. No. 834,381 filed Feb. 28, 1986 now abandoned.

BACKGROUND OF THE INVENTION

U.S. Pat. Nos. 3,959,974, 4,301,655 and 4,417,447 issued to L. B. Thomas, disclose several embodiments of a combination internal combustion-steam engine, the power of which is increased and the efficiency of which is improved by cyclicly injecting water through the cylinder head into the combustion space above the piston when the power cylinder is sufficiently hot to produce superheated steam. While all three of the patented engine structures achieve the enumerated objectives, the improvement herein includes an engine structure which will more completely exhaust all of the combustion gases and improve the power characteristics of a gasoline or diesel engine. Furthermore, these patents represent improvements in two-cycle engines and the water injection concept can be improved by using a four-cycle principle and utilizing two companion cylinders to complete the four-cycle operation.

Accordingly, it is an object of this invention to provide a water-injection internal combustion engine which can be built to operate on either the Diesel principle of compression ignition or the Otto principle of low compression using a carburetor or fuel injection and spark ignition. Either technique will produce the heat needed by internal combustion for generating the superheated steam according to the invention.

Another object of this invention is to provide a new and improved water injection, internal combustion engine of the four-cycle design, which engine is characterized by sets of at least two companion cylinders separated by at least one transfer valve, one of which cylinders initiates combustion, wherein the burning gases are forced through the transfer valve into the second power cylinder where water is injected and the power and exhaust strokes are completed.

Another objecte of the invention is to provide a four-cycle, water-injection, internal combustion engine of either the compression ignition or spark ignition design, which engine is characterized by at least two companion cylinders having ceramic liners at the upper ends thereof and cooperating pistons with upper ceramic surfaces for reciprocation in the cylinders, respectively, with a pair of transfer valves located between the cylinders.

Yet another object of this invention is to provide a four-cycle, water-injection engine which can be adapted for compression ignition or spark ignition operation, which engine includes at least one pair of companion compression and power cylinders served by ceramic pistons, each of the cylinders having a conventional lower portion and a ceramic upper portion for operation at high temperatures, with a pair of transfer valves located between and communicating with the compression and power cylinders, wherein a fuel and air mixture is first compressed and burned in the compression cylinder and is then routed through the transfer valves to the power cylinder, where steam is generated to enhance the power cycle.

SUMMARY OF THE INVENTION

These and other objects of the invention are provided in a water-injection, four-cycle, compression ignition or spark ignition engine having at least one compression cylinder and piston and a companion power cylinder and piston, wherein air or air and fuel, depending upon Diesel or Otto cycle operation, are drawn by aspiration or forced by turbocharger into the compression cylinder as the corresponding compression piston moves down on the first cycle of operation. The air or air and fuel are then compressed by the returning upward stroke of the compression piston, fuel is introduced into the compression cylinder under circumstances of Diesel operation and combustion takes place in the compression cylinder. While the fuel is burning and the compression piston is still on the upward stroke, the transfer valve or valves located between each compression cylinder and power cylinder open and allow the hot gases to pass into the power cylinder to complete the second cycle of the four-cycle operation. The power piston operating in the power cylinder is designed to operate approximately 50 degrees ahead of the compression piston in the compression cylinder and has already reached top dead center and started down on the power stroke when the transfer valve or valves closes, thus isolating the hot gases in the power cylinder. As the power piston nears the bottom of the power stroke, the exhaust valve or valves open, thus completing the third cycle of operation. All gases are expelled from the power cylinder by the power piston when it moves upwardly on the fourth cycle, the exhaust valve then closes and the first cycle of operation begins again. The power cylinder and power piston get very hot, since the burning gases are transferred to the power cylinder very soon after combustion is initiated in the compression cylinder. As a result of this, very little heat is absorbed in the compression cylinder.

The pistons used in this invention are identical to those described in my U.S. Pat. No. 3,959,974. They are ceramic displacement-type pistons having a ringless top section capable of withstanding high temperatures. The ceramic pistons operate in a cylinder liner constructed of the same ceramic material as the pistons, most preferably a silicone carbide derivative, as hereinafter described. This combination of power piston and cooperating cylinder liner requires no lubrication in the hot upper section of the engine.

DESCRIPTION OF THE PREFERRED EMBODIMENTS

Figure 1:
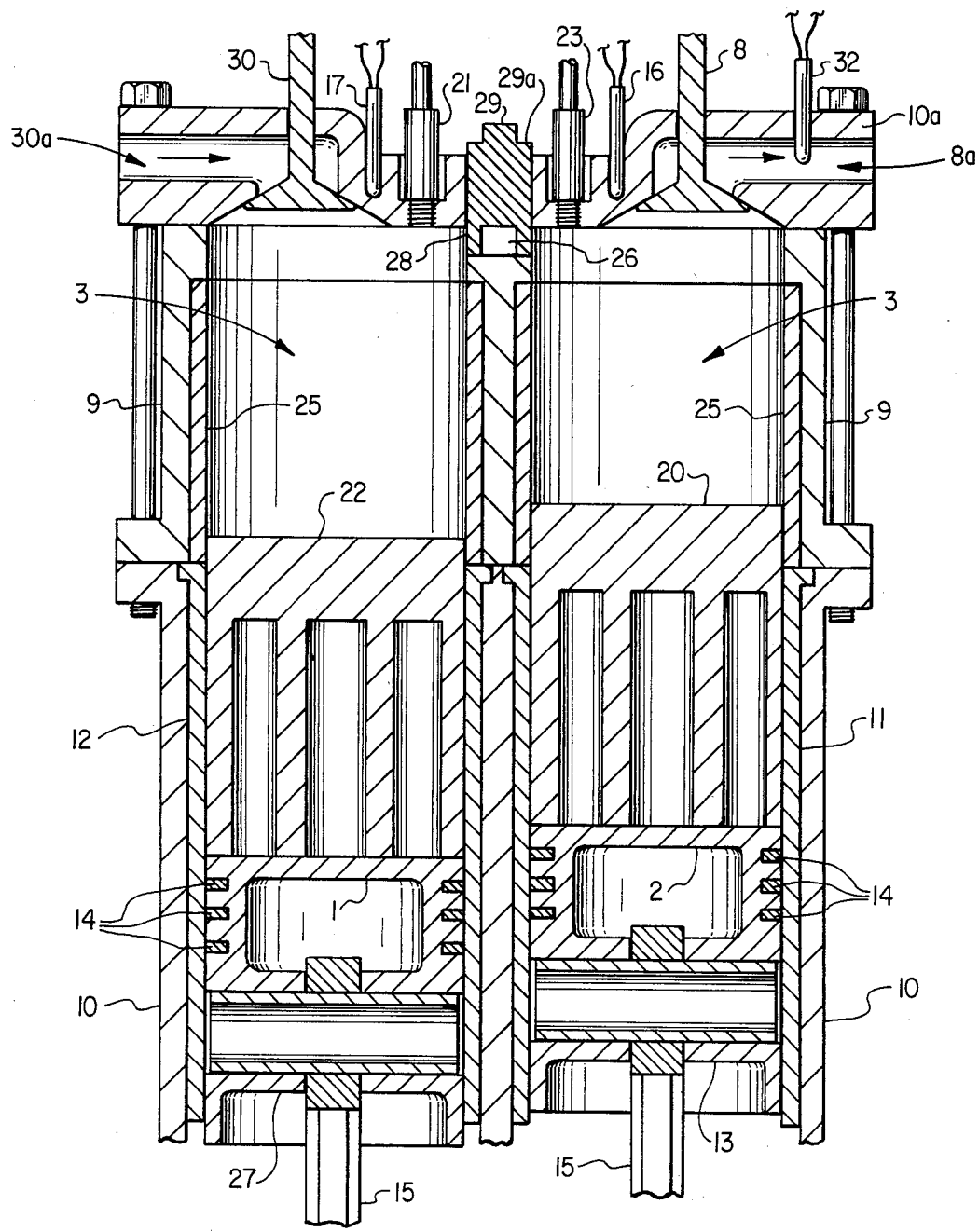
FIG. 1 is a typical vertical cross-sectional view taken through two cylinders of the improved engine of this invention, showing the compression piston, transfer valve and power piston constructed in accordance with the invention, using the Diesel cycle principle.
Figure 3:
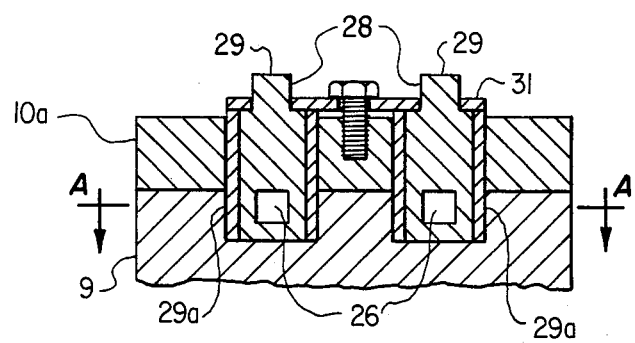
FIG. 3 is a vertical cross-sectional view taken through the transfer valve assembly illustrating two transfer valves and associated elements.
Figure 4:
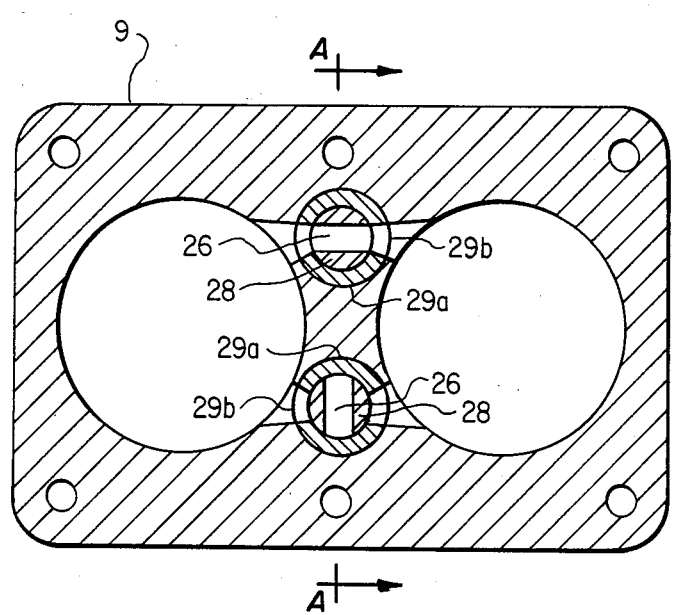
FIG. 4 is a horizontal cross-sectional view taken through the upper engine block also showing the two transfer illustrated in FIG. 3.

Referring to FIGS. 1, 3 and 4 of the drawings a pair of companion cylinder and piston combinations is illustrated for simplicity, although it will be appreciated that the invention can be embodied in engines having various numbers of cylinders in different engine configurations. As illustrated, a compression cylinder 12 is provided with a ceramic liner 25 at the top portion thereof and receives a compression piston 1, having a ceramic compression piston portion 22, as illustrated. A companion power cylinder 11 is also provided with a ceramic liner 25 and receives a power piston 2, having a ceramic power piston portion 20. The ceramic compression piston portion 22 and the ceramic power piston portion 20 operate in an upper cylinder block 9, which houses the ceramic liners 25. The lower compression portion 27 of the compression piston 1 and the lower power portion 13 of the power piston 2 are fabricated of metal in conventional fashion and are provided with conventional rings 14. The lower compression portion 27 and ceramic compression piston portion 22, as well as the lower power portion 13 and the ceramic power piston portion 20 of the compression piston 1 and the power piston 2, respectively, reciprocate in conventional cylinder bores 3, respectively, provided in the engine block 10. Conventional piston rods 15 drive the compression piston 1, as well as the power piston 2, respectively, from a common crankshaft (not illustrated). Since the piston and cylinder configuration illustrated in FIG. 1 is designed for Diesel operation, a fuel injector 21 is provided in the head 10a above the compression cylinder 12, along with a compression cylinder heat sensor 17 and an intake valve 30, positioned in the intake port 30a. An exhaust valve 8 is located in the exhaust port 8a of the head 10a above the power cylinder 11, along with a water injector 23, a power cylinder heat sensor 16 and an exhaust heat sensor 32, located in the exhaust port 8a. A pair of transfer valves 28, each having a valve body 29 rotatably provided in a valve cylinder 29a, are located in the head 10a between the compression cylinder 12 and the power cylinder 11. The lower segments of the transfer valves 28 are seated in the upper cylinder block 9 by means of a valve mount plate 31 and a mount bolt 33, as illustrated in FIG. 3.

Figure 2:
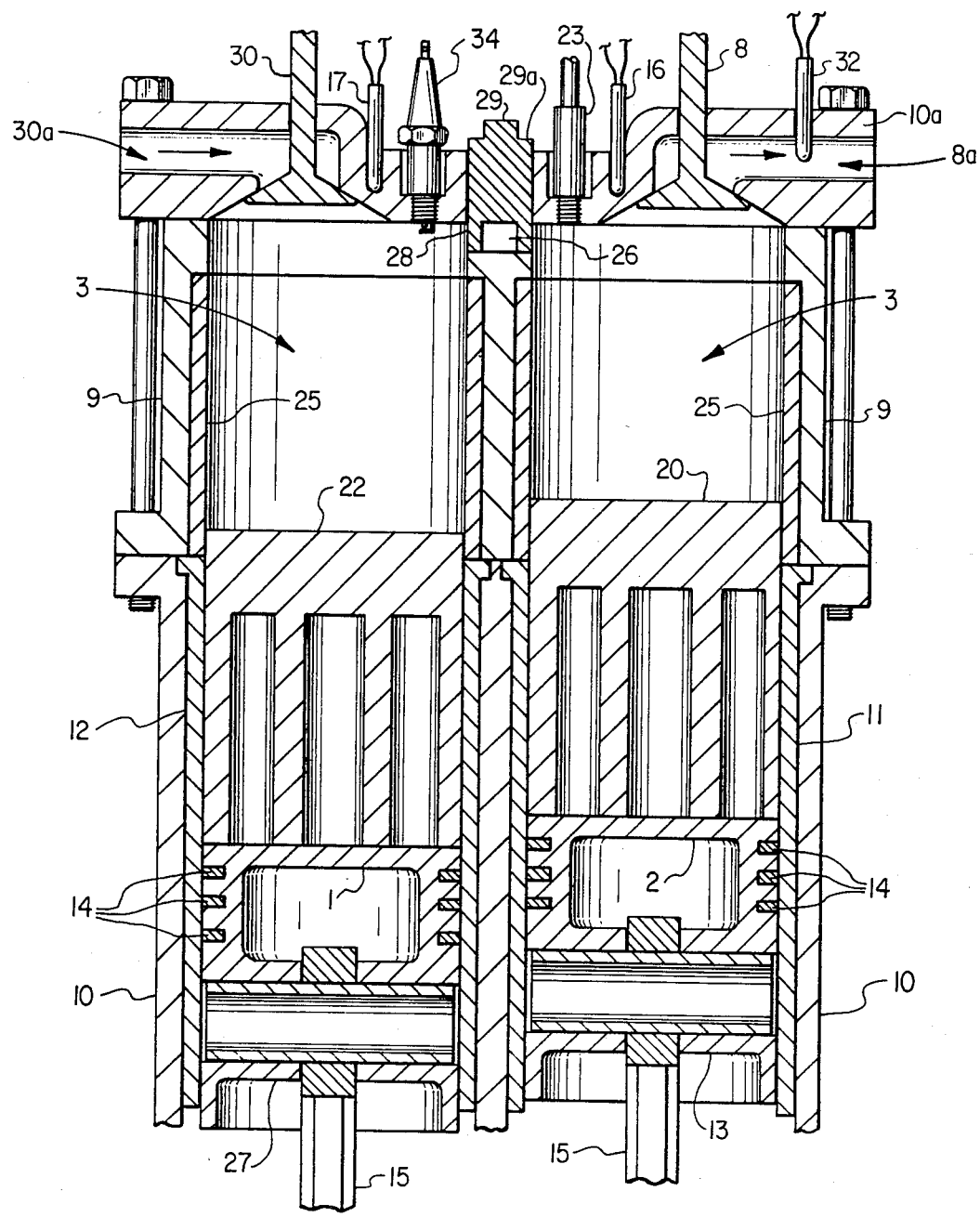
FIG. 2 is a typical vertical cross-sectional view taken through the cylinders of the improved engine, showing the compression piston, transfer valve and power piston constructed in accordance with the invention, using the Otto cycle principle.

Referring now to FIGS. 2, 3 and 4 of the drawings a second compression cylinder 12 and power cylinder 11 configuration is disclosed, which is indentical to the configuration illustrated in FIG. 1, with the exception of a spark plug 34, located in the head 10a and extending into the cylinder bore 3 of the compression cylinder 12. The engine configuration illustrated in FIG. 2 is set up for spark ignition operation and also includes a pair of transfer valves 28 located between the compression cylinder 12 and the power cylinder 11. As illustrated in FIGS. 3 and 4 of the drawings, in a most preferred embodiment of the invention a pair of transfer valves 28 is preferably located between the respective compression cylinders 12 and power cylinders 11 in both the compression ignition and spark ignition versions of the engine of this invention which are illustrated in FIGS. 1 and 2, respectively. Each of the valve bodies 29 of the transfer valves 28 are equipped with a passage 26 and located in the lower portion thereof, and with a registering valve port 29b, located in the respective valve cylinders 29a. This mechanical arrangement facilitates the transfer of hot, compressed combustion gasses from the compression cylinder 12 to the power cylinder 11, as hereinafter described.

Referring again to FIGS. 1, 3 and 4 of the drawings, the four-cycle Diesel principle begins operation in the first engine configuration modified according to this invention as the compression piston 1, located in the compression cylinder 12, starts down on the first cycle by operation of a conventional starter mechanism (not illustrated). The intake valve 30 then opens and air is drawn by aspiration or forced by a turbocharger through the intake port 30a and into the cylinder bore 3 of the compression cylinder 12. As the compression piston 1 starts upwardly to begin the second, or compression cycle, the intake valve 30 closes and the air is compressed to the compression ignition point. Fuel is then injected through the fuel injector 21 into the cylinder bore 3 of the compression cylinder 12 and starts to burn. At this point the transfer valve 28 open and the hot, burning gases pass through the respective aligned valve ports 29b and passages 26 located in the valve bodies 29 and valve cylinders 29a of the transfer valves 28, into the power cylinder 11 above the ceramic power piston portion 20 of the power piston 2. The power piston 2 has by this time reached top dead center in the power cylinder 11 and has begun the downward power stroke. The compression piston 1 continues upwardly in the compression cyclinder 12 to top dead center, forcing all hot gases through the valve ports 29b and the passages 26, into the cylinder bore 3 of the power cylinder 11 and the transfer valves 28 then close. When the power piston 2 reaches the bottom of the power stroke, the exhaust valve 8 opens and all gases are expelled through the exhaust port 8a as the power piston 2 reverses direction and moves upwardly. When the power piston 2 reaches the top of the power stroke, the exhaust valve 8 closes.

When the ceramic liner 25 in the power cylinder 11 and the ceramic power piston portion 20 are sufficiently hot, a circuit through the power cylinder heat sensor 16 (not illustrated) closes and a computer (not illustrated) initiates the steam cycle. A small quantity of water is injected at high pressure through the water injector 23 into the cylinder bore of the hot cylinder bore 3 and water vapor impinges on the top of the ceramic power piston portion 20 of the power piston 2, producing super-heated steam in a few milliseconds. The pressure and expansion of the steam forces the power piston 2 downwardly in the power cylinder 11 on the power stroke.

Referring now to FIG. 2 of the drawings, the four-cycle Otto engine cycle begins as the compression piston 1, located in the compression cylinder 12, starts down on the first cycle. The intake valve 30 opens and a combustible mixture of air and fuel is drawn or by aspiration forced by turbocharger through the intake port 30a into the cylinder bore 3 of the compression cylinder 12. As the compression piston 1 starts upwardly in the compression cylinder 12 to begin the second cycle, the intake cycle 30 closes and the combustible mixture is compressed and ignited by the spark plug 34. At this point, the transfer valves 28 open by operation of a cam (not illustrated) or by alternative means known to those skilled in the art, and the hot, burning gases pass through the valve ports 29b and passages 26 into the cylinder bore 3 of the power cylinder 11 above the power piston 2, which by this time has reached top dead center and has started moving downwardly on the power stroke. Meanwhile, the compression piston 1 continues upwardly to top dead center in the compression cylinder 12, forcing all hot gases into the power cylinder 11 and the transfer valve 28 then closes. When the power piston 2 reaches the bottom of the power stroke, the exhaust valve 8 opens and all gases are expelled through the exhaust port 8a as the power piston 2 reverses direction and travels upwardly; when the power piston 2 reaches the top of the exhaust stroke the exhaust valve 8 closes.

When the ceramic liner 25 in the power cylinder 11 and the ceramic power piston portion 20 of the power piston 2 are sufficiently hot, a circuit through the power cylinder heat sensor 16 closes and a computer (not illustrated) begins the steam cycle as in the case of the Diesel engine configuration illustrated in FIG. 1. As heretofore described, a small amount of water is injected at high pressure into the hot cylinder bore 3 and on to the top of the ceramic power piston portion 20 of the power piston 2, producing super-heated steam. The pressure and expansion of the steam, coupled with the expanding combustion gasses, force the power piston 2 downwardly on the power stroke.

In both of the variations illustrated in FIGS. 1 and 2, the engine of this invention can be operated with one or more transfer valves 28, located between each set of companion compression cylinders 12 and power cylinders 11, respectively, as heretofore noted. The transfer valve 28 configuration illustrated in FIGS. 3 and 4 illustrates the use of two transfer valves 28 which are constructed of a high temperature-resistant material, similar to silicon carbide, that requires no lubrication and is able to withstand very high temperatures. In a first operational mode, each transfer valve 28 is opened by turning the valve body 29 approximately 90 degrees to align the passage 26 with the corresponding valve port 29b located in the valve cylinder 29a and turning the valve body 29 back to the original position to close the passage 26. In a second operational mode, each transfer valve 28 can also be opened and closed by raising and lowering each valve body 29 with respect to the valve cylinder 29a as a sliding valve using cam action, as in conventional engines using overhead valves. As illustrated in FIG. 4, one of the transfer valves 28 is illustrated in the open position, while the other transfer valve 28 is shown in the closed position; however, in a preferred mode of operation, both transfer valves 28 will be opened and closed by turning the respective valve bodies 29 in concert.

In a most preferred embodiment of the invention a preferred material of construction for the liners 25 of the compression cylinder 12 and power cylinder 11, respectively, the ceramic compression piston portion 22 of the compression piston 1, the ceramic power piston portion 20 of the power piston 2 and all components of the transfer valves 28, is similar to a silicon carbide ceramic. However, other ceramic materials which will retain structural integrity at high temperatures can be used in the engine of this invention according to the knowledge of those skilled in the art.

In yet another preferred embodiment of the invention the ceramic compression piston portion 22 of the compression piston 1 is attached to the lower compression portion 27 by cement bonding or by methods such as bolting. Furthermore, the ceramic power piston portion 20 of the power piston 2 is similarly attached to the lower power portion 13.

It will be understood that in addition to water, other vaporable liquids, including ethyl alcohol and other liquids which are miscible with water, in non-exclusive particular, can be used as the injection medium under circumstances of freezing weather.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A method of operating an internal combustion steam engine including a pair of adjacent cylinders with a reciprocating piston in each cylinder, the first cylinder of said pair operating as a compression cylinder, the second cylinder of said pair operating as a power cylinder, a first valve means associated with only the first cylinder, a second valve means associated with only the second cylinder, and a third valve means associated with a flow of fluid between the cylinders, said method comprising the steps of:
  (a) cylically opening and closing the first valve means to allow air to be drawn into the compression cylinder in a timed relationship with the movement of the compression piston;
  (b) compressing said air as the compression cylinder moves toward top-dead-center;
  (c) opening the third valve means to allow communication between the two cylinders when the power piston has reached top-dead-center and the compression piston is stil approximately 50 degrees from top-dead-center so that the pressure in both cylinders is equalized;
  (d) "injecting fuel into the compressed air in a timed relationship with the opening of said third valve means and igniting the fuel and air mixture".
  (e) maintaining a constant volume of the burning gases as the power piston moves downward from top-dead-center and the compression piston continues to move upward towards top-dead-center;
  (f) closing the third valve means when the compression piston reaches top-dead-center to thereby isolate substantially all of the combustion gases in the power cylinder;
  (g) injecting a small amount of high pressure water into the hot gases now continued in the power cylinder to generate superheated steam whereby useful work is obtained as the steam expands within the power cylinder;
  (h) opening the second valve means in a timed relation to exhaust fluid from the power cylinder after completion of the expansion stroke.

* * * * *

UNITED STATES PATENT AND TRADEMARK OFFICE
CERTIFICATE OF CORRECTION

PATENT NO. : 4,783,963

DATED : November 15, 1988

INVENTOR(S) : Luther B. Thomas

It is certified that error appears in the above-identified patent and that said Letters Patent is hereby corrected as shown below:

Column 6, line 36, "stil" should read -- still --.

Column 6, line 51, "continued" should read -- contained --.

Signed and Sealed this

Twenty-fifth Day of April, 1989

Attest:

DONALD J. QUIGG

Attesting Officer

Commissioner of Patents and Trademarks